United States Patent [19]

Okun

[11] 4,403,840
[45] Sep. 13, 1983

[54] VARIABLE FOCUS EYEGLASSES

[76] Inventor: Milton R. Okun, P.O. Box 377, Canton, Mass. 02021

[21] Appl. No.: 241,781

[22] Filed: Mar. 9, 1981

[51] Int. Cl.³ .............................................. G02C 1/00
[52] U.S. Cl. ...................................... 351/41; 351/83
[58] Field of Search .................. 351/41, 83, 159, 168; 350/419

[56] References Cited

U.S. PATENT DOCUMENTS 2,576,581 11/1951 Edwards .............................. 350/419

*Primary Examiner*—John K. Corbin
*Assistant Examiner*—Rodney Bovernick
*Attorney, Agent, or Firm*—David Silverstein

[57] ABSTRACT

This invention relates to variable focus eyeglasses comprising flexible and rigid optical components. The rigid components act as molds which modify the optical properties of the flexible components when the flexible and rigid components are engaged.

At least one of the flexible or rigid components is movable along an anterior-posterior axis, resulting in the distortion and restitution of a flexible component by one or more rigid components thereby altering the optical properties of the system.

A spring mechanism located in the nosepiece or bridge portion of the eyeglasses may be used to facilitate the anterior-posterior movement of the movable components.

19 Claims, 10 Drawing Figures

VARIABLE FOCUS EYEGLASSES

BACKGROUND OF THE INVENTION

Multiple focal length eyeglasses of various types are well-known in the art. The most familiar are the bifocal lens variety wherein the upper portion of each optical lens consists of a longer focal length prism, suitable for aiding an individual's distance vision, and the lower portion of each optical lens consists of a shorter focal length prism, suitable for aiding an individual's reading vision. Such bifocal type eyeglasses suffer, however, from many objectionable features. Many persons consider them unsightly and embarrassing to wear because the horizontal line along which the upper and lower lenses are joined is normally readily visible, and such lenses are frequently associated with elderly persons even though many middle-aged persons require separate eyeglasses for reading and for normal wear. Furthermore, an individual's field of vision is significantly restricted by bifocal lenses. The upper portion of such lenses is useful only for distance vision, the lower portion of such lenses is useful only for close or reading vision, and the center portion of such lenses is partially obscured by the dividing line between the upper and lower portions.

Accordingly, for a long time, efforts have been made to obtain the convenience of variable focal length properties in a single pair of eyeglasses while eliminating the objectionable features of bifocal lenses. To this end, several varieties of adjustable focal length optical lenses have been proposed. One variety of adjustable focal length optical lenses consists of a non-flexible lens having a partially liquid-filled cavity as shown in U.S. Pat. No. 4,174,156 (Glorieux). When the axis of this lens is horizontal, the central portion of the cavity contains only air; when the axis of this lens is forwardly inclined, the center portion of the cavity fills with liquid thereby changing the focal length of the lens depending on the liquid used and the size of the cavity. It should be apparent that variable focal length lenses of this type suffer from exactly the same objectionable features as do more conventional bifocal lenses.

A variation of this concept is shown in U.S. Pat. No. 2,437,642 (Henroteau) which eliminates at least one of the problems of the Glorieux patent. In Henroteau, the liquid is stored in small reservoirs attached to the lens frames and is, alternately, added to or removed from the lens' cavities as required by rotating the lens frames. Thus, this invention eliminates the unsightly line of demarcation across the face of the lenses and expands the field of vision. On the other hand, it requires the presence of, perhaps, even less aesthetically appealing liquid reservoirs attached to each lens frame.

A second variety of adjustable focal length optical lenses consists of flexible lenses of several types and used in different ways. One type of variable focus eyeglasses using flexible lenses is shown in U.S. Pat. Nos. 3,598,479 (Wright) and 4,181,408 (Senders). These patents describe eyeglasses employing at least partly flexible liquid-filled lenses in which the curvature of the lens, thus its focal length, can be varied by adding fluid to or withdrawing it from an interior cavity in the lens. In these patents, the liquid reservoir is cleverly concealed in the temple bow or side arm portions of the eyeglass frames. Each of these patents, however, requires a delicate, complex and relatively expensive mechanical or electromechanical mechanism in order to pump the working fluid into and out of the flexible lenses as required. Also, with the eyeglasses in constant use, there is the ever-present possibility of rupturing the small ducts which carry the fluid between the lenses and the reservoirs. This is particularly true at the corners where the side arm portions of the eyeglass frame are movably joined to the front or lens-holding portion of the frame. It is perhaps for this very reason that the Senders patent has the side arms immovably joined to the front portion of the eyeglass frame.

Still another variation of the use of flexible lenses is where the curvature, thus the focal length, is varied by changing the shape of the lens frame. Such embodiments are briefly disclosed in U.S. Pat. No. 2,300,251 (Flint) and British Pat. No. 758,668 (Russell) although neither of these patents suggests a specific means of accomplishing this result.

In short, none of the prior art teaches an entirely satisfactory mechanism for varying the focal length of optical lenses.

OBJECTS OF THE INVENTION

Accordingly, it is the principal object of this invention to provide a new type of optical instrument which permits multiple visual correction using a single pair of eyeglasses.

It is a further object of this invention to provide a type of variable focus eyeglasses which does not impair the field of vision.

It is another object of this invention to provide a type of variable focus eyeglasses in which the focal length can be easily and readily adjusted.

It is also an object of this invention to provide a type of variable focus eyeglasses which is relatively inexpensive to construct and readily lends itself to normal wear without danger of damage.

It is still another object of this invention to provide a type of variable focus eyeglasses which is not cosmetically unappealing and does not readily reveal to persons other than the wearer the variable focal length properties.

These and other objects and advantages of this invention will become apparent from the following description.

DESCRIPTION OF THE PREFERRED EMBODIMENT

Figure 1:
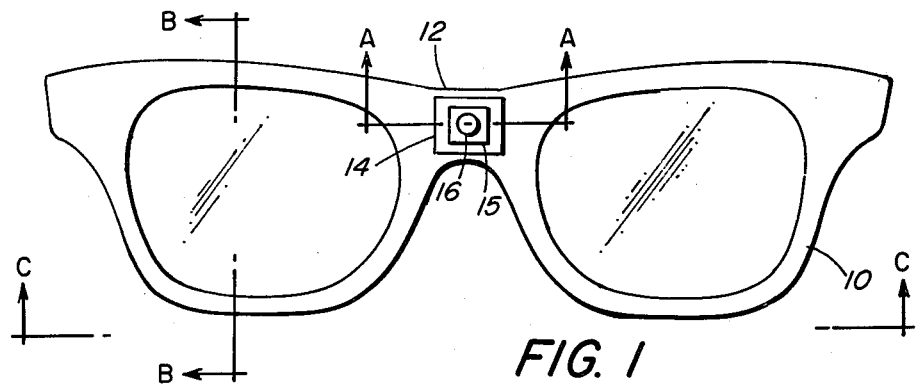
FIG. 1 is a front view of the eyeglasses and frames of this invention.

FIG. 1 is a front view of the preferred embodiment of the variable focus eyeglasses of this invention. Eyeglass frame 10 includes a bridge or nosepiece portion 12. Centrally located on bridge portion 12 is a spring-activated catch-release mechanism 14, a spring release button 16 and a spring housing 15. The purpose of the catch-release mechanism and the spring release button is to facilitate easy and rapid adjustment of the focal length of the eyeglasses as described hereinafter.

Figure 2:
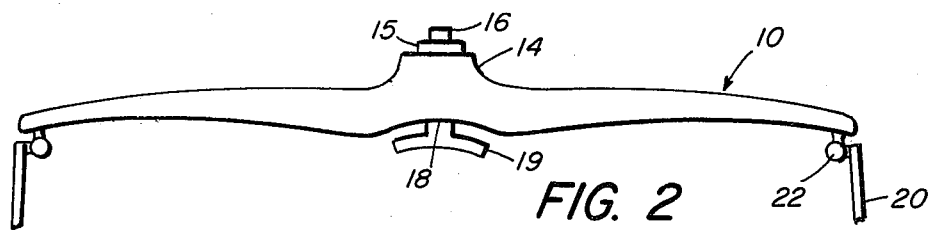
FIG. 2 is a bottom view of the eyeglass frame shown in FIG. 1 as viewed along the line C—C.

FIG. 2 is a bottom view of eyeglass frame 10 showing bridge portion 12, catch-release mechanism 14, spring release button 16 and spring housing 15. Also shown are sidearms 20 movably connected to eyeglass frame 10 by means of conventional pin and sockets 22 and brow rest 19, the purpose of which is described hereinafter.

Figure 3:
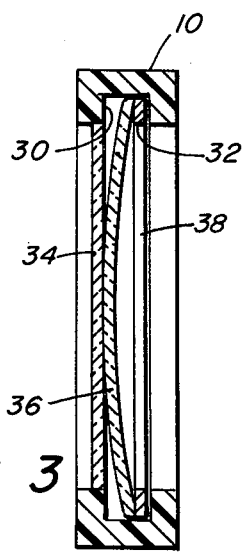
FIGS. 3 and 4 are sectional side views of one embodiment of the eyeglass frame and lenses taken along the section B—B of FIG. 1.
Figure 4:
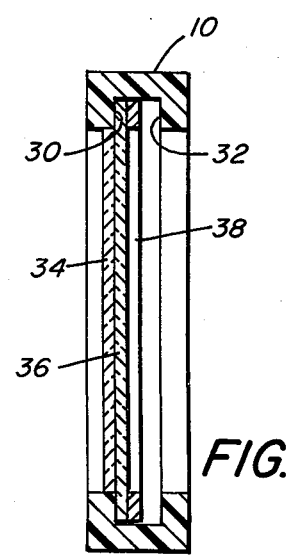
Figure 10:
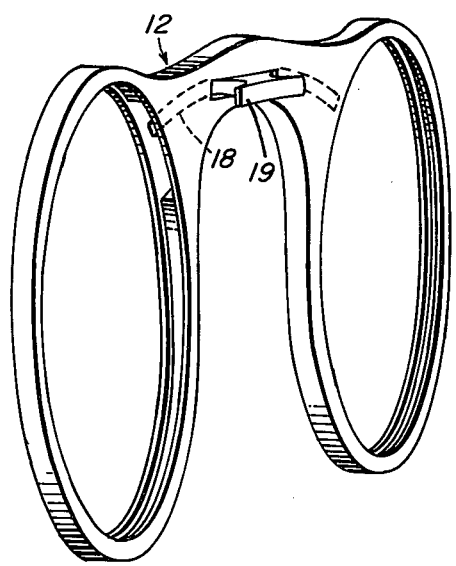
FIG. 10 is a partial rear perspective view of the eyeglass frame of this invention.

FIGS. 3 and 4 are sectional side views of eyeglass frame 10 taken along the section B—B of FIG. 1. The lens portion of eyeglass frame 10 is generally circular in shape and generally of a U-shaped cross-section thereby defining a circular interior track, as shown in FIG. 10, consisting of a continuous forward frame edge 30 and a continuous rear frame edge 32. Disposed between said forward frame edge 30 and said rear frame edge 32 are a stationary, rigid forward component 34, a movable, rigid rear component 38 and, positioned therebetween, a flexible component 36. The dimensions of rear component 38 and flexible component 36 are adapted such that both are engaged by the interior track of the eyeglass frame yet are capable of limited lateral movement between frame edges 30 and 32 along an axis perpendicular to the plane of stationary forward component 34 without undue sticking or friction. At the same time components 36 and 38 overlap frame edges 30 and 32 sufficiently that there is no danger of these components falling out of eyeglass frame 10 during normal use.

In the preferred embodiment of this invention, forward component 34 is a thin, flat and perfectly transparent plate which may be made from glass, hard plastic or any other suitable material. Similarly, in the preferred embodiment, rear component 38 is a thin, flat and perfectly transparent plate made from glass, hard plastic or any other suitable material. In this embodiment, flexible component 36 is movable and curved. In another embodiment of this invention, forward component 34 and rear component 38 may be curved, provided the curvatures of both lenses are substantially identical, while flexible component 36 is flat.

In one embodiment of this invention, two separately made rear components 38, one for the left and one for the right side of eyeglass frame 10 (see FIG. 1), are securely fastened together by means of bridge bar 18 (see FIG. 10) which passes through a hollow interior section of bridge portion 12 of the eyeglass frame as shown in FIG. 10. Thus, by forward movement of the bridge bar, rear components 38 can be simultaneously displaced from a position in which they rest against rear frame edges 32, as shown in FIG. 3, to a position in which rear components 38 contact flexible components 36 which, in turn, are pressed forwardly against stationary forward components 34 and forward frame edges 30. This compressed or anterior position is shown in FIG. 4. This embodiment in which two separately made rear components 38 are fastened together by means of a bridge bar is particularly well suited for the embodiment in which forward components 34 and rear components 38 are curved.

In the preferred embodiment in which forward components 34 and rear components 38 are substantially flat, however, a simplified variation of this invention is possible in which the two rear components 38 and the bridge bar joining them are fashioned as a single, substantially flat component.

In the preferred embodiment of this invention, flexible component 36 is forwardly convex and fashioned from soft, transparent plastic or any other suitable material. When the components are in the posterior or uncompressed position shown in FIG. 3, flexible components 36 have their normal curvature and act as lenses resulting in a given set of optical properties. When rear components 38 are moved forward by means of the bridge bar to the compressed or anterior position shown in FIG. 4, flexible components 36 are compressed between rear components 38 and forward components 34. In the fully compressed, forward position, as shown in FIG. 4, flexible components 36 have no curvature and neutral optical properties.

Numerous variations of these ideas will be apparent to those skilled in the art. For example, one or more of the components 34, 36 and 38 may be tinted or colored to produce sun-screening effects or add to the aesthetic appeal of these eyeglasses. Components having photochromic properties may be used. For some special applications it may be desirable to use polarized lenses for one or more of the optical components of this invention.

In still another variation, one or more additional stationary lenses may be added to the apparatus to obtain a variety of compound lens optical properties. Such additional stationary lenses might be positioned either forward of components 34 or rearward of components 38 without interfering in any way with the operation of this invention.

It is also possible to design the eyeglass frame 10 such that the rear portion which includes rear frame edges 32 is detachable from the front portion which includes forward frame edges 30. This arrangement greatly facilitates replacement or adjustment of the several optical components.

Depending upon the construction of the frame and the materials used for the lenses, it may be desirable in some cases to eliminate forward components 34. In this embodiment, flexible components 36 are flat and stationary and rear components 38 are curved and moveable. In the compressed, anterior position, flexible components 36 are molded against rear components 38.

Figures 5, 6:
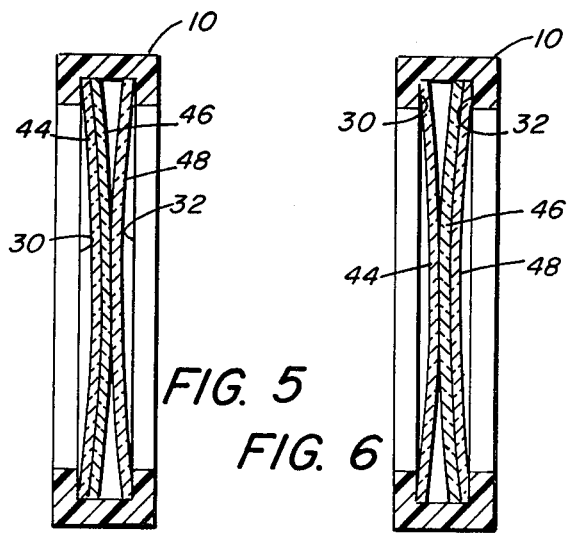
FIGS. 5 and 6 are sectional side views of another embodiment of the eyeglass frame and lenses taken along the section B—B of FIG. 1.

Another embodiment of this invention is illustrated in FIGS. 5 and 6. In this embodiment, a flexible component 46 is disposed between two curved rigid components 44 and 48, each of which is convex with respect to the flexible component. Components 44 and 48 are thin enough so as to have negligible optical effects in themselves. In this embodiment, flexible component 46 is molded against forward component 44 in the anterior position shown in FIG. 5 and against rear component 48 in the posterior position shown in FIG. 6 thereby changing the optical properties of the device.

Figure 7:
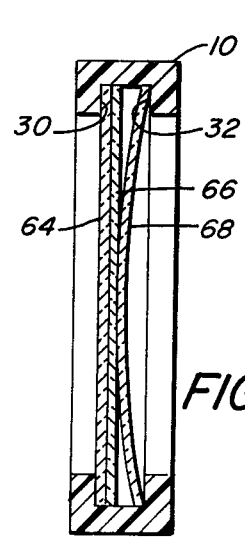
FIGS. 7 and 8 are sectional side views of still another embodiment of the eyeglass frame and lenses taken along the section B—B of FIG. 1.
Figure 8:
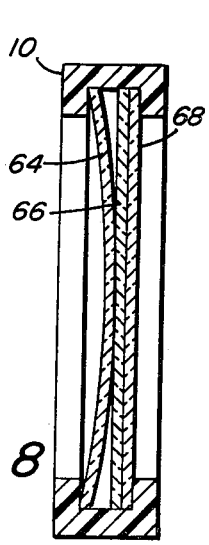

In still another embodiment of this invention, illustrated in FIGS. 7 and 8, a flat, transparent and rigid component 66 is disposed between two flexible, curved components 64 and 68. In this embodiment, rigid component 66 compresses forward curved component 64 into optical neutrality in the anterior position shown in FIG. 7. In the posterior position shown in FIG. 8, rigid component 66 compresses rear curved component 68 into optical neutrality thereby effecting a change in the optical properties of the device. Through routine experimentation, the proper thickness and curvature of these various components and the distance between the forward and rear frame edges can be determined to meet any optical needs.

Although the movable components of the eyeglass frames as described above can be moved forward or backward by means of the bridge bar for purposes of adjusting the focal length of the eyeglasses of this invention by any suitable means, including manual adjustment, in the preferred embodiment of this invention eyeglass frame 10 includes a catch-release mechanism 14 operated by a spring release button 16, as shown in FIG. 1. A blow-up of a sectional view of one such type of device is shown in FIG. 9.

Figure 9:
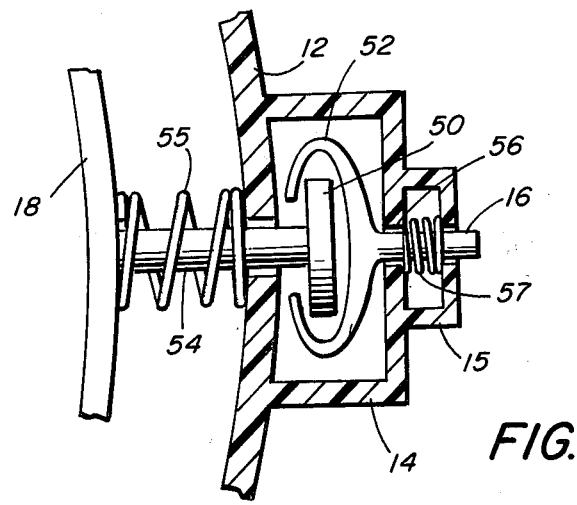
FIG. 9 is a blow-up of a sectional view of the bridge-nosepiece portion of the eyeglass frame taken along the section A—A of FIG. 1.

FIG. 9 shows the external housing 14 of the catch-release mechanism which is centrally located on bridge portion 12 of eyeglass frame 10 (see FIG. 1). Inside housing 14 is a pair of interlocking latches 50, 52. A shaft 54 extends rearwardly from male latch 50 through the eyeglass frame to the point where it meets and is joined to bridge bar 18. Spring means 55 are disposed between bridge portion 12 of the eyeglass frame and bridge bar 18. A shaft 56 extends forwardly from female latch 52, passes through another housing 15 containing spring means 57, and terminates in spring release button 16.

When bridge bar 18 and bridge portion 12 are squeezed together, spring means 55 are compressed until interlocking latches 50, 52 catch and hold. Bridge bar 18 and bridge portion 12 can be easily squeezed together by someone wearing the variable focus eyeglasses of this invention merely by applying backward pressure with one finger on the forward bridge portion 12. To facilitate this ready adjustment, it is desirable to extend shaft 54 (FIG. 9) rearwardly of bridge bar 18 and to connect with a brow rest 19 as shown in FIGS. 2 and 10. Brow rest 19 may be made flat or curved to better fit the contour of the eyebrow portion of the human skull. The brow rest may be fashioned from any suitable material, but it is especially preferred to pad the inner surface which contacts the skin with felt, foam rubber or similar materials.

For example, in FIG. 10, bridge bar 18 and the optical components to which it is attached (not shown) are shown in the posterior position. When pressure is applied to the forward bridge portion 12 with brow rest 19 firmly resting against the individual's eyebrow, bridge bar 18 and bridge portion 12 are squeezed together moving the bridge bar and the connected optical components into the anterior position where they are securely held by interlocking latches 50 and 52. When spring release button 16 is pushed, however, the latches are disengaged and spring means 55 force bridge bar 18 and bridge portion 12 apart returning the bridge bar to the posterior position.

Although this is one simple and inexpensive form of quick release mechanism suitable for this invention, it is contemplated and within the scope of this invention that other such mechanisms be used. The advantage of using this type of device is that, once properly set, this mechanism facilitates rapid, easy and repeatable adjustment of the focal length of the eyeglasses of this invention.

The variable focus eyeglasses of this invention thus overcome many if not most of the objectionable features of prior devices, namely the problems of excessive cost, cosmetic undesirability and excessive time needed to effect adjustments.

Having thus described the invention, what is claimed is:

1. Apparatus for variable focus eyeglasses comprising:
   (a) right and left frame means for holding a plurality of optical components comprising forward and rear frame edges defining a single continuous interior track of generally circular shape; and
   (b) a plurality of rigid and flexible optical components adapted to fit securely within the single interior track of each frame means such that at least one of said flexible or rigid optical components is movable along an anterior-posterior axis within said track resulting in the distortion and restitution of a flexible component by one or more of the rigid components so as to vary the focal length of the eyeglasses.

2. The apparatus of claim 1 wherein said plurality of optical components comprises:
   (a) a substantially flat, rigid optical component capable of movement from an anterior to a posterior position within said frame means; and
   (b) a flexible, curved optical component.

3. The apparatus of claim 1 wherein said plurality of optical components comprises:
   (a) a flexible curved optical component capable of movement from an anterior to a posterior position within said frame means; and
   (b) a substantially flat, rigid optical component.

4. The apparatus of claim 1 wherein said plurality of optical components comprises:
   (a) a substantially flat, flexible optical component; and
   (b) a rigid, curved optical component which is convex in the direction of said flexible component and capable of movement from an anterior to a posterior position within said frame means.

5. The apparatus of claim 1 wherein said plurality of optical components comprises:
   (a) a substantially flat, flexible optical component capable of movement from an anterior to a posterior position within said frame means; and
   (b) a rigid, curved optical component which is convex in the direction of said flexible component.

6. The apparatus of claim 1 wherein said plurality of optical components comprises:
   (a) two curved, rigid optical components mutually convex with respect to one another; and
   (b) a flexible optical component disposed between said rigid components and capable of movement from an anterior to a posterior position within said frame means.

7. The apparatus of claim 1 wherein said plurality of optical components comprises:
   (a) two curved, flexible optical components; and
   (b) a substantially flat, rigid optical component disposed between said flexible components and capable of movement from an anterior to a posterior position within said frame means.

8. The apparatus of claim 1 wherein one or more of said optical components are colored or tinted.

9. The apparatus of claim 1 wherein one or more of said optical components have photochromic properties.

10. The apparatus of claim 1 wherein one or more of said optical components are polarized.

11. The apparatus of claim 1 additionally comprising a bridge portion and nosepiece joining together said right and left frame means and a bridge bar joining together the movable components of said right and left frame means.

12. The apparatus of claim 11 wherein said bridge bar passes through a hollow interior portion of said bridge portion and nosepiece section of the frame.

13. The apparatus of claim 11 wherein said bridge bar and the movable components of said right and left frame means are fashioned as one continuous piece.

14. Apparatus for variable focus eyeglasses comprising:
 (a) right and left frame means for holding a plurality of optical components comprising forward and rear frame edges defining a continuous interior track of generally circular shape;
 (b) a plurality of rigid and flexible optical components adapted to fit securely within each track of said frame means such that at least one of said optical components is capable of limited lateral movement within said track from an anterior to a posterior position so as to vary the focal length of the eyeglasses;
 (c) a bridge portion and nosepiece joining together said right and left frame means and a bridge bar joining together the movable components of said right and left frame means; and
 (d) spring-operated catch-release means centrally located on said bridge portion for alternately switching the optical components between the anterior and posterior positions.

15. The apparatus of claim 14 additionally comprising:
 (a) rear shaft means slidably passing through said bridge portion of said frame and perpendicular thereto, connected at its forward end to male latch means and at its rear end to said bridge bar;
 (b) spring means disposed between said bridge bar and said frame;
 (c) forward shaft means slidably passing through a housing on the forward side of said frame and perpendicular thereto, connected at its forward end to an exposed release button and at its rear end to female latch means designed to engage said male latch means; and
 (d) spring means located in said housing and attached to said forward shaft means.

16. The apparatus of claim 15 additionally comprising a brow rest disposed along the rear side of the bridge portion of said frame and connected to said bridge bar by means of a shaft passing through an opening in the bridge portion of the frame.

17. A method for adjusting the focal length of an optical instrument, said instrument comprising a plurality of rigid and flexible optical components disposed within a single track of a frame such that at least one of said flexible or rigid optical components is movable along an anterior-posterior axis within said track, said method comprising moving said movable optical component from a position of engagement with a second optical component to a position of disengagement with said second component or from a position of disengagement to a position of engagement with a second optical component resulting in the distortion and restitution of a flexible component by one or more of the rigid components so as to vary the focal length of the instrument.

18. The method of claim 17 comprising moving said movable optical component from a position of engagement with a second optical component to a position of engagement with a third optical component.

19. A method for adjusting the focal length of an optical instrument, said instrument comprising a plurality of rigid and flexible optical components disposed within a frame such that at least one of said optical components is capable of limited lateral movement within said frame, said method comprising moving said movable optical component from a position of engagement with a second optical component to a position of disengagement with said second component or from a position of disengagement to a position of engagement with a second optical component by the use of spring-operated catch-release means for effecting rapid adjustment between the engaged and disengaged positions of said optical components, thereby varying the optical properties of the flexible component.

* * * * *